United States Patent

[11] 3,629,585

[72] Inventors Francois Desvignes
Bourg-La-Reine;
Paul Guiochon; Jean Pompei, both of Evreux, all of France
[21] Appl. No. 889,027
[22] Filed Dec. 30, 1969
[45] Patented Dec. 21, 1971
[73] Assignee U.S. Philips Corporation
New York, N.Y.
[32] Priority Dec. 31, 1969
[33] France
[31] 182969

[54] IMMERSED BOLOMETER USING THIN FILM THERMISTORS
4 Claims, 4 Drawing Figs.
[52] U.S. Cl. .................................................. 250/83 R,
250/83.3 H
[51] Int. Cl. .................................................. G01t 1/16
[50] Field of Search .......................................... 250/83 R,
83.3 H; 73/193 R, 355 R; 338/18, 19, 22 R

[56] References Cited
UNITED STATES PATENTS
2,414,792 1/1947 Becker .......................... 338/18 X
3,059,113 10/1962 McHenry ..................... 338/18 X
3,453,432 7/1969 McHenry ..................... 250/83.3 H Primary Examiner—Archie R. Borchelt
Assistant Examiner—Davis L. Willis
Attorney—Frank R. Trifari ABSTRACT: Differential, immersed, thermistor bolometer formed by a planoconvex, transparent lens-support and two thermistors, one active and one compensation element, both deposited on the flat face of said lens.

PATENTED DEC 21 1971

INVENTORS
FRANCIOS DESVIGNES
BY PAUL GUIOCHON
JEAN POMPEI

AGENT

IMMERSED BOLOMETER USING THIN FILM THERMISTORS

The invention relates to an immersed thermistor bolometer.

It is known that a bolometer is intended to measure the power of a radiation, particularly in the infrared range.

The sensitive member of such a device is a negative temperature coefficient resistor, usually termed "thermistor," the ohmic value of which varies considerably with an increase in temperature under the action of said radiations.

In order to raise the sensitivity of a bolometer, the thermistor is often mounted on an appropriate optical system by which the rays incident to the entrance face are compelled to converge towards the thermistor. This optical system usually comprises a hemispherical lens, at the center of curvature of which is arranged the thermistor, which lens therefore serves at the same time as a mechanical support for the thermistor: the bolometer is then termed an "immersed bolometer." As a matter of course, the substance of the lens-support has to be permeable to the infrared radiation: it is preferred to use a substance such as germanium, which provides the double advantage of having a high refractive index (about 4), which with a given lens surface and a given radiation density permits of increasing the energy captured by the thermistor, and a satisfactory thermal conductivity (0.15 cal./sec./° C.), which is conducive to the decrease in the time constant of the bolometer.

It is furthermore known that the detector circuit of a thermistor bolometer comprises usually two thermistors: one of them, the "active" element, is exposed to the radiation to be measured, whereas the other, the "compensation" element, is on the contrary protected against the radiation.

In order to protect the compensation element from the influence of the radiation said compensation element of the known bolometers is usually arranged behind an absorbing screen, which is arranged in turn behind the active element for the radiation. This disposition brings about some mechanical difficulties in assembling, which is increased by the fact that the thermistors of the type employed in bolometers are very vulnerable elements. These elements are formed by tablets punched from suitable material, mostly a compound of metal oxides such as manganese, iron, nickel, cobalt, provided on one major face with two contact zones of silver. In order to minimize the thermal inertia of each of the thermistors, it is required to use very thin tablets. However, the detecting power of a bolometer (which value corresponds substantially to the signal-to-noise ratio with a given radiation frequency and intensity) varies inversely proportionally to the square root of the surface of its active element, which requires the use of tablets of small surface. The mechanical resistance of the tablets is therefore low and their manufacture and use give rise to numerous difficulties, particularly in fixing them to supporting lenses. Moreover, during the operations required for fixing to the lens-supports the properties of the thermistors may be modified.

To these difficulties in manufacture and use of the two tablet-shaped thermistors has to be added the necessity of a satisfactory match at least in respect of the ohmic value in the detection circuit of the bolometer in order to protect said detection circuit from the influence of fluctuations of the ambient temperature. This requirement of matching involves a strict selection of the tablets subsequent to their manufacture and hence an important amount of rejects and a loss of time.

A further difficulty is involved in the comparatively great noise due to the electric contacts at the surfaces of the tablets. The noise level is an essential characteristic of a bolometer and it is essential to reduce the value thereof. However, the granular surface of the tablets renders very difficult the formation of ohmic contacts of low noise level.

In order to simplify the manufacture of bolometers and to obtain better achievements particularly with regard to the reduction of the time constant and the noise level, attempts have been made to modify the structure and the nature of the material used for the thermistors: French Pat. No. 1,294,692 of July 12, 1961 discloses a bolometer in which the oxides have been replaced by germanium or silicon deposited in the form of thin layers on the lens-support previously coated with an insulating layer.

The substitution of a similar material in thin layers for a solid material brings about, in fact, an appreciable reduction of the time constant of the thermistor element. The use of germanium and silicon instead of the oxides, however, involves other delicate problems.

It should first be noted that the transparency of silicon to infrared radiation is neither perfect nor uniform and varies considerably with the doping concentration. Therefore, the use of this material can be considered only for some specific frequencies of said radiations.

On the other hand germanium has a substantially uniform transparency throughout the width of the infrared spectrum and for this very reason it is used for the lens-support. However, this transparency involves a difficulty in the manufacture of a bolometer with the aid of said material. Since the germanium thermistor layer is not sensitive to the radiations, it has to be covered by an opaque layer which transfers to said thermistor layer the thermal energy captured. For this reason the thin germanium layer is directly contacted with a layer of a blackening substance of the kind usually employed in this field, termed gold-black, platinum-black etc., which increases the manufacturing difficulties and tends to vary the ohmic value of the thermistor and its radiation response curve.

Furthermore in accordance with U.S. Pat. No. 3,312,572 of Apr. 4, 1967, relating to the manufacture of thermistors formed by thin layers of germanium or silicon, a further difficulty resides in the accurate doping of the thin deposited layer and in the application of nonrectifying contacts. For this reason the whole vapor-deposition process has to be carried out in a single cycle in a residual atmosphere free of any oxygen; the substrate has to be completely pure as well as the evaporation crucible in order not to contaminate the deposited sensitive layer; the substrate has to be heated at given temperatures in precise and different ways during the deposition of the germanium and of the contact metal and the space must not be opened before the internal temperature has dropped by progressive cooling to the level of the ambient temperature, which may take 2 to 3 hours. It should be noted that only bismuth and antimony can be used for making the contact zones; bismuth, however, has a low melting temperature (~271° C.), which adds a further difficulty to the connection of the thermistor to external contact wires, the bismuth being likely to be softened and hence also the sensitive subjacent layer. On the other hand the presence of an oxidized layer at the interface between the germanium and the bismuth or antimony involves invariably a rectifying effect of the contact, so that it is necessary to operate in an atmosphere as little oxidizing as possible.

The extreme variability of the ohmic resistance of germanium or silicon as a function of their dopant concentration and the sensitivity of this resistance to the slightest impurity render it very difficult to obtain a chosen value of said resistance. This difficulty is accounted for by the special precautions mentioned above taken during the evaporation process.

A further complication brought about by the use of germanium or silicon is related to the necessity of electrically insulating the thermistor layer of the mass of the lens-support, if the latter is metallic as is the case with a germanium lens. For this purpose, irrespective of the nature of the material of the thermistor, germanium, silicon or oxides, a selenium film has hitherto been employed. This element has the high required resistivity and a satisfactory transparency to infrared radiation; however, its melting point is low (~271° C.), so that it is likely to sublimate in vacuo. During the vapor-deposition process for the sensitive layer it may disappear from the surface of the lens, so that the insulation between the lens and the sensitive layer may be deteriorated. It has been proposed, for example, in French Pat. No. 1,398,252 of May 26, 1964, to replace selenium by a vitrious layer containing suitable proportions of selenium, arsenic, sulfur and thallium. However, this vitrious compound is not suitable for a sensitive layer of a semiconductor such as germanium, because the latter may be contaminated so that its ohmic properties might be adversely affected.

From the foregoing it will be obvious, that the replacement of the sensitive oxide tablet in an immersed thermistor bolometer by a thin layer of germanium or silicon entails serious technological problems, which can, however, be solved.

The invention has for its object to provide a differential, immersed, thermistor bolometer of a mechanical structure and of a nature, structure and of machined thermistor elements such that the manufacture of said bolometer is simplified and its achievements are improved as compared with the known bolometers, the properties being readily reproducible.

The invention is based on the recognition of the fact that it is possible to obtain thin layers of complex conductive, semiconductive or dielectric bodies comprising, for example, in an intimate bond a plurality of oxides and that by joining identically and simultaneously the active and compensation elements of the bolometer and by depositing said elements on the same support it is substantially certain for a quasi-perfect identity of the elements to be obtained.

According to the invention an immersed thermistor bolometer comprises an infrared transparent hemispherical lens having optically attached with the interposition of an insulating film, transparent to infrared, to the center of the plane of the lens a thermistor element provided with metallic current supply members, characterized in that, with the interposition of an insulating layer the plane surface of the lens has a second thermistor element mounted thereon outside the central area thereof, whereby said second thermistor element is substantially incapable of receiving infrared radiation transmitted by said lens, said first and second thermistor element consisting of a resistive layer comprising essentially at least one metallic oxide deposited in situ by cathode sputtering under controlled circumstances identical for each of said thermistor elements, said metallic current supply members of said thermistor elements being constituted by vacuum-deposited metal layers.

One of the essential advantages of the invention is that it permits of arranging two elements simultaneously (an active element and a compensation element) by using a preferential method which forms explicitly a subject matter of this invention. In this method two thermistors are deposited simultaneously in the form of thin layers by joint methods of evaporation in vacuo and cathode sputtering.

Both these methods are well known, but the use thereof in the present case renders the construction of the two thermistors easier. Moreover, the thermistors can be fastened more readily. Only the tightness of the adhesion may leave to be desired, but sufficient experience has not been gathered in materials in thin layers for choosing among them the materials compatible for mechanical connection.

The parallel obtainment of the two thermistors has the further advantage that these two thermistors are substantially identical, which ensures a substantial equality of ohmic values and a correspondence of the further properties.

In order to ensure that the compensation element is protected from the incident radiation it is sufficient to arrange between the lens-support and said compensation element a suitable metal screen also obtained in the form of a thin layer.

The mechanical manufacture of the bolometer is also simplified as compared with that of the bolometer having tablet-shaped thermistors in a sense such that it is much easier to define sensitive surfaces of very small dimensions, when these surfaces are formed by thin layers (as stated above the detective power of a bolometer varies inversely with the square root of the surface of its sensitive element). It is sufficient to use appropriate masks during vapor-deposition and sputtering, whereas with oxide tablets which must have a minimum surface and a minimum thickness for being handled and for obtaining adequate mechanical rigidity it is necessary to reduce the surface of the active elements by means of complementary screens interposed during assembling of said elements and lenses.

As a constituent material of the thin layer of the thermistors all substances may be used which have both a high resistivity and a high negative temperature coefficient (for example, elements such as boron and binary compounds such as indium sulfide). However, it is preferred to use a composition of transition metal oxides which behave as valence-controlled semiconductors, for example, a ternary composition of manganese oxide (75 percent), nickel oxide (20 percent) and cobalt oxide (5 percent). It is known to obtain such a substance in the form of a thin layer either by impingement on a disc of the same substance in the solid state or in the powdery state in a cathode-sputtering space, which disc is previously prepared by a known method used for the manufacture of ceramic materials, especially ferrites, or, as described in the Applicant's patent application Ser. No. 170,009 of Oct. 15, 1968, by direct synthesis by reactive cathode sputtering of a composite disc comprising suitable proportions of each of the metals forming part of the composition of said substance.

The replacement of a tablet of $150\mu$ to $200\mu$ thick of material for thermistors having a substantially uniform chemical composition by a thin layer of the same material ($1\mu$ $10\mu$) permits of drastically reducing the thermal inertia of the bolometer. The time constant changes from a value of 5 to 6 msec. to a value of less than 0.4 msec.

The method of manufacturing thin thermistor layers according to the invention, cathode sputtering, provides layers having, if necessary, a high coefficient "$\beta$." This coefficient "$\beta$" corresponds to the level of thermal activation of a layer and permits of calculating the temperature coefficient of the material by the relation:

$$\alpha = -\beta/T^2.$$

wherein $T$ is the absolute temperature of said material.

Experience shows that it is now possible to obtain a value $\beta$ of at least 5000° K. for a layer of transition metal oxides, which corresponds to 25° C. with a temperature coefficient of about $-5.5$ percent. By way of comparison it should be noted that the average temperature coefficient of a thermistor formed by a conventional oxide tablet is about $-4$ percent, whilst with a thin germanium layer the coefficient is only $-3$ percent.

The increase in temperature coefficient permits of increasing accordingly the response of the bolometer (ratio between the maximum signal voltage derived from the active element and the average value of the incident radiation energy with a given frequency or frequency band of the radiation) and the detective power.

It should furthermore be noted that the noise level of a bolometer of thin layers according to the invention is lower than that of a conventional bolometer, whilst the noise level is practically independent of the thickness of the layer. This improvement is obtained particularly owing to the corresponding improvement in the output contacts of the sensitive layer. The latter is more compact in the form of a thin layer than in the form of fritted material; the granulation is finer and the surface is less rough. The contact with the metal layer is therefore more intimate in spite of the fact that the contact layer itself is very thin. On the other hand the quality of the contact is further improved by the fact that it is obtained by vacuum-deposition, which is preferred for mechanical silver-deposition.

Moreover as compared with bolometers having thin layers of germanium or silicon the thin-layer bolometers according to the invention, the sensitive surface of which contains in particular oxides, provide the technical advantage of an easier establishment of the contact zones. With oxides the rectifying effect of contacts as in germanium and silicon does not occur. The material of the contact element may therefore be chosen in a wide range of materials or alloys, the choice not being restricted to the two substances: bismuth and antimony as in the case of germanium or silicon. With oxides the application of contacts does not involve any special problem and it is, for example, not necessary for the atmosphere of the space to be absolutely free of any trace of oxygen.

In the technological field it is, moreover, not necessary for a bolometer having thin layers in accordance with the invention to be left alone for a longer time after the depositions, as is the case with germanium or silicon layers. This means an enormous gain in time in manufacture.

An oxide layer is much more stable and neutral with respect to contaminants than a germanium or silicon layer. Therefore, the manufacture of the bolometer according to the invention is particularly simplified by the fact that it does not require particular precautions with respect to the purity of the atmosphere or of the various elements of the vapor-deposition or sputtering devices or of the substances of the layers. The industrial output and the reproducibility in manufacture are thus improved.

The manufacture of a differential, immersed, thermistor bolometer according to the invention starts by the deposition of an infrared-absorbing material in a region of the flat face of a hemispherical germanium lens not being the central region of said face. Nickel in a comparatively thick layer ($\sim 1\mu$) is very suitable for this purpose; it is vapor-deposited on a very fine substrate of nickel-chromium, which serves for the mechanical connection with the germanium of the lens. On said nickel layer and on the central region of the lens is subsequently deposited in vacuo from the vapor phase or by cathode sputtering a layer of a substance having a satisfactory dielectric rigidity, a satisfactory infrared transparency, a suitable thermal conductivity and being capable of ensuring a satisfactory optical contact with the germanium and with the subjacent oxide layer. Moreover, this substance has to be capable of resisting without deteriorating the ion and electron bombardment to which is necessarily subjected during the ultimate deposition of the sensitive layer. For the transition layer providing the insulation from the germanium lens selenium has hitherto been preferred. For a bolometer, according to the present invention, selenium is not appropriate, since owing to its low melting point the selenium would sublimate during the sputtering operation. It is therefore advantageous to use substances such as silicon oxides, preferably silicon monoxide owing to its high dielectric constant. This insulating layer has then deposited on it the two thermistors, one - the active element - on the center of the flat face, and the other - the compensation element - displaced from the center of the flat face and centrally to the nickel deposit initially made on the lens. Said nickel deposit operates as a screen between the infrared radiation and the compensation element, which is therefore not heated like the active element. Since the compensation element is shifted in place from the radiation-converging region, the subjacent nickel deposit is therefore heated only slightly and this heat is rapidly absorbed by the lens whose thermal capacity is comparatively high. The temperature of the compensation element thus remains practically equal to the ambient temperature.

The thermistors of thin layers of oxides of said active and compensation elements may be formed in various ways with respect to the depositions of the sensitive layers and the output contact zones, which may be in the inverse order.

It is advantageous to use a structure in which the electric field of the supply current is at right angles to the plane of the sensitive layer. The process of forming the various layers of the two bolometer thermistors comprises the vapor-deposition in vacuo of a film of a nickel-chromium alloy, on part of which is deposited the sensitive layer, after which again a nickel-chromium film coated with a nickel layer of the same size as the part not coated by the sensitive layer of the first nickel-chromium film is deposited. The first nickel-chromium film, which establishes the electric contact with the face opposite the sensitive layer of the thermistors, does not cause, owing to its very small thickness ($\sim 150$ Å.), an appreciable reduction of the energy incident to the active element of the bolometer, although it is located in the trajectory of the infrared radiation.

The nickel-chromium-nickel layer of a thickness of about $1\mu$ forming the electrode opposite the thermistor is opaque to the radiation and therefore contributes favorably to the output of the bolometer by reflecting the very small fraction of radiation energy not absorbed by the sensitive layer on the direct trajectory to said layer.

This thermistor structure permits of obtaining bolometers whose active and compensation elements have a low resistance and yet a high temperature coefficient (5 to 6 percent). Owing to the low resistance the supply voltage for the detector of the bolometer may be reduced accordingly without adversely affecting the detecting power so that the use of these apparatus is facilitated.

Although this structure is more suitable than others for obtaining thermistors of low ohmic value, it is possible to obtain thermistors of high ohmic value, which can be readily adjusted to a given, reproducible level. This possibility is appreciable for a bolometer, since it simplifies the problem of obtaining a satisfactory compatibility between its detector device and the amplifier following the detector.

The invention will now be described more fully with reference to the accompanying drawing.

Figure 1:
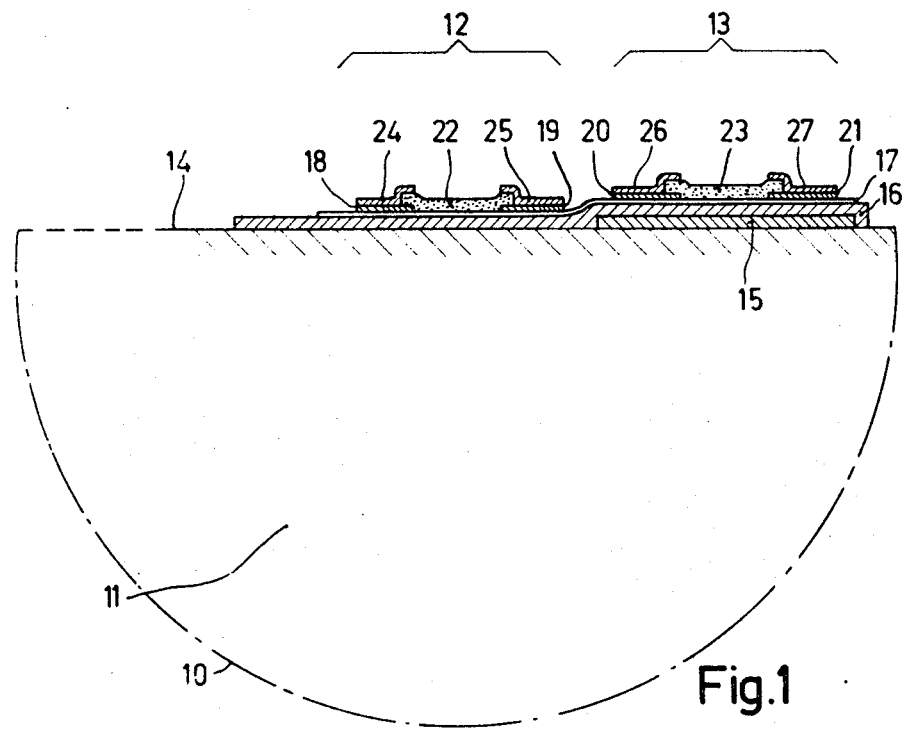
FIG. 1 is a sectional view of the active and compensation elements of a differential, immersed, thermistor bolometer according to the invention mounted on the lens of the bolometer in a first embodiment of said elements.
Figure 2:
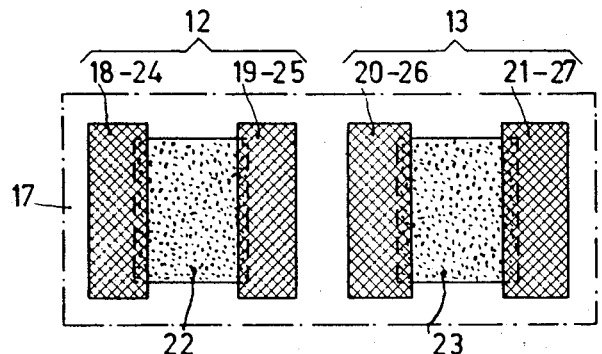
FIG. 2 is a plan view of said elements.

The dot-and-dash line 10 outlines the hemispherical envelope of the lens 11 of an immersed bolometer. It should be considered that as compared with the active element 12 and the compensation element 13 of the bolometer, which elements are shown on an enlarged scale, the lens 11 has in fact much greater dimensions (the radius of the lens is 3 to 4 mm., whereas the elements 12 and 13 occupy on said lens a surface of the order of 1 mm.$^2$). Moreover, the distance between the two elements 12 and 13, is in fact, 1 to 2 mm.$^2$.

The active element 12 is optically centered to the flat face 14, forming the substrate of the lens 11, whereas the compensation element 13 is arranged eccentrically at will. This arrangement satisfies the requirement of exposing the active element to the infrared radiations concentrated by the lens 11 in its optical center; on the contrary, the compensation element has to be protected from said radiation.

On the substrate 14 a metal layer 15 is deposited in order to provide a screen protecting against the radiation to the element 13 by vacuum vapor-deposition with the aid of a suitable mask. The layer 15 comprises, for example, a fastening film of nickel-chromium of a thickness between 100 and 150 A., on which a nickel layer of a thickness of about $1\mu$ is deposited.

Then the layer 15 and the central region of the substrate 14, where finally the active element 12 will be deposited, are covered by a slightly infrared-absorbing, dielectric layer 16, for example, of silicon monoxide by vapor-deposition in vacuo or cathode sputtering.

In order to form a barrier to the diffusion of materials of the upper layers into the subjacent germanium it is advantageous to cover the silicon monoxide layer 16 with a silicon nitride layer 17, the thickness of which is at the most $0.1\mu$. This operation is carried out by cathode sputtering.

On the layer 17 can then be formed the two elements 12 and 13. These elements are applied simultaneously.

On the silicon nitride layer 17 is then first deposited in four regions of the surface of rectangular shape 18, 19, 20 and 21 a metal layer, for example, of nickel-chromium of a thickness of 100 to 150 A. and then a nickel layer of a thickness of about $1\mu$. These deposits are obtained with the aid of a suitable mask.

The two layers 22 of sensitive substance of the active element and 23 of the compensation element are subsequently deposited by cathode sputtering across a mask. Said sensitive substance is, for instance, a composition of manganese-nickel-cobalt oxides. Such a substance may be employed in the form of a thin layer either by impinging of a target plate of the same substance in the solid or powdery state in a cathode-sputtering space, which target plate is prepared in the solid form by a known method used for preparation of ceramic material, for example, ferrite or, as disclosed in the Applicant's patent application Ser. No. 170,009 of Oct. 15, 1968, by direct synthesis by reactive cathode sputtering of a composite target plate, on which each of the metals constituting said substance are provided in suitable ratios.

The thickness of the layers 22 and 23 is on an average $2\mu$ to $10\mu$ as desired.

Finally by vapor deposition in vacuo the metal layers 24, 25, 26 and 27 are provided also simultaneously by using masks like for the layers 18, 19, 20 and 21.

The electric contact zones on the active element 12 are formed by the assemblies of the layers 18-24 and 19-25, whereas the assemblies 20-26 and 21-27 ensure the contacts on the compensation element 13.

The deposits 24, 25, 26, 27 are advantageously formed as sublayers of a chromium-nickel alloy with a thickness of about 150 A., and then a layer of nickel of about $1\mu$. Their surfaces are coated with a gold layer of about $1\mu$ to $2\mu$ in order to facilitate the establishment of electric contacts with the aid of conductor wires by thermocompression.

Figure 3:
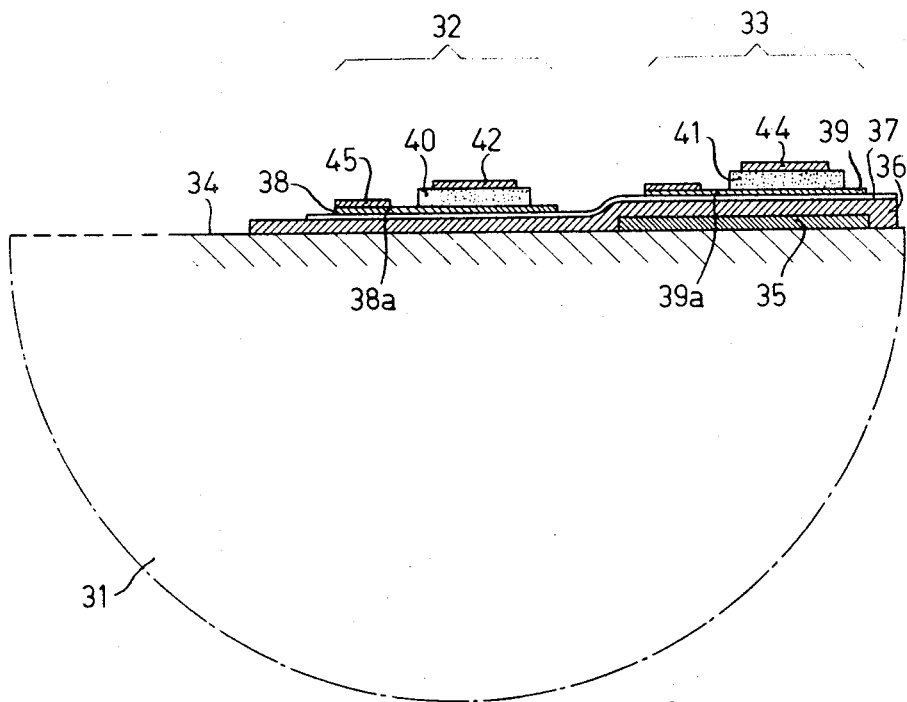
FIG. 3 is a sectional view of the two sensitive elements of a bolometer according to the invention with a second structure of said elements.
Figure 4:
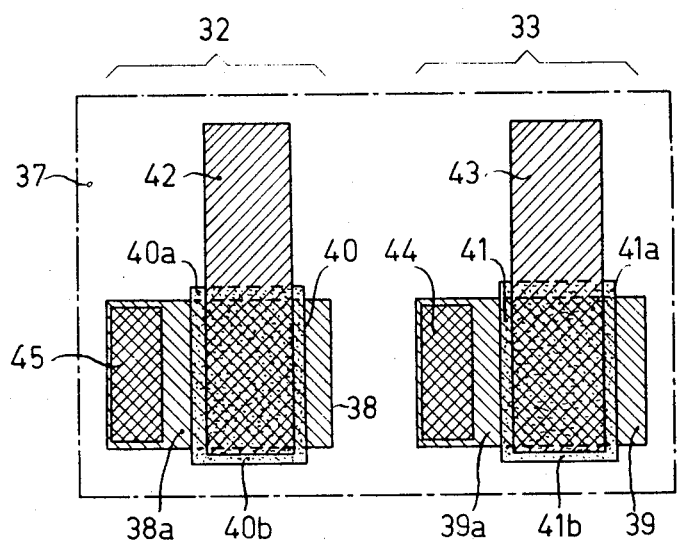
FIG. 4 is a plan view of the two sensitive elements shown in the sectional view of FIG. 3.

Another structure of the active and compensation elements for an immersed bolometer is shown in FIGS. 3 and 4.

As with the bolometer described above the operations preceding the deposition of the two elements 32 and 33, the active element and the compensation element respectively, are in order to succession:

deposition of a nickel-chromium-nickel screening layer 35 on the face 34 of the lens 31, which layer constitutes the protective screen for the element 33, deposition of a silicon-monoxide layer 36 covering the screening layer 35 and the central region of the substrate 34, deposition of a diffusion barrier 37 of silicon nitride.

These various layers are obtained by the method mentioned above for the first structure of the bolometer according to the invention and the surfaces and thicknesses are practically the same.

As stated above, the active element 32 has to be optically centered on the face 34 of the substrate of the lens 31, whereas the compensation element 33 has, on the contrary, to be out of the optical center. The distance between these two elements is also 1 to 2 mm.².

On the silicon nitride layer 37 are deposited by vapor-deposition in vacuo layers of nickel-chromium 38 and 39. The deposit 38 serves to form one of the electrodes of the element 32, whereas the deposit 39 has to fulfill the same function for the element 33. These two deposits 38 and 39 may be of nickel-chromium and their thickness is 100 to 200 A.

The sensitive substance, for example, an oxide compound is then deposited by cathode sputtering in a thickness of $2\mu$ to $10\mu$ in order to form the deposit 40 for the active element and the deposit 41 for the compensation element.

The deposit 40 is disposed so that it is optically centered to the lens 31. Each of the two deposits 40 and 41 covers partly the subjacent layer 38 or 39, leaving exposed a surface element 38a and 39a of each of these layers for establishing a contact with the device external of the thermistors. The deposit 40 extends by 40a and, if necessary, by 40b up to the silicon nitride layer 37. The deposit 41 extends also by 41a and, if necessary, by 41b up to the same layer 37.

Finally by vapor-deposition in vacuo the metal layers 42 and 43 are formed, which form the second electrodes of the elements 32 and 33 respectively, which metal layers cover the layers 40 and 41 almost completely and extend up to the layer 37. Simultaneously with the deposition of said layers 42 and 43 contact zones for the external connections are defined by the deposits 44 and 45 on the parts 38a and 39a of the layers 38 and 39. The deposits 42, 43, 44 and 45 are formed, for example, first by a fine nickel-chromium film of 100 to 150 A., covered by layers first of nickel, then of gold with an overall thickness of about $1\mu$ to $2\mu$.

The layers 42 and 43 have, with respect to the sensitive layers 40 and 41, the function of reflectors feeding back to said layers 40 and 41 the radiation energy not absorbed along the direct trajectory of the radiation.

In the two embodiments of the bolometer according to the invention the active and compensation elements are substantially coplanar. The place of the active element on the lens is defined fairly accurately by the necessity of arranging it in the converging zone of the infrared radiation, but the compensation element may be arranged in a plane differing from that of the active element, for example, for secondary reasons foreign to the operation of the bolometer. It remains, however, necessary for the two elements to be arranged on the lens in a substantially equal manner with respect to the vapor sources or the sputtering target plates so that the identity of the geometric and physical features of the elements is obtained.

What is claimed is:

1. An immersed thermistor bolometer comprising an infrared transparent hemispherical lens having a plane surface, an infrared transparent insulating film on said plane surface of said lens in the region of the optical center of said lens, a thermistor element optically attached to said insulating film at said optical center, an infrared opaque layer on said plane surface distal from said optical center, a heat-insulating layer on said opaque layer, said insulating film and said insulating layer both comprising silicon monoxide, a second thermistor element mounted on said insulating layer, said first and said second thermistor elements each comprising a resistive layer comprising at least one metallic oxide, and means to electrically contact said first and said second thermistor elements.

2. An immersed thermistor bolometer as claimed in claim 1 further comprising a diffusion-blocking layer between said first thermistor element and said insulating film and between said second thermistor element and said insulating layer.

3. An immersed thermistor bolometer as claimed in Claim 2, wherein said diffusion-blocking layer comprises silicon nitride.

4. An immersed thermistor bolometer comprising an infrared transparent hemispherical lens having a plane surface, an infrared transparent insulating film on said plane surface of said lens in the region of the optical center of said lens, a thermistor element optically attached to said insulating film at said optical center, an infrared opaque layer on said plane surface distal from said optical center, a heat-insulating layer on said opaque layer, a second thermistor element mounted on said insulating layer, said opaque layer comprising a nickel-chromium layer facing said plane surface and a nickel layer facing said second thermistor element, said first and said second thermistor element each comprising a resistive layer comprising at least one metallic oxide, and means to electrically contact said first and said second thermistor elements.

* * * * *

PO-1050
(5/69)

UNITED STATES PATENT OFFICE
CERTIFICATE OF CORRECTION

Patent No. 3,629,585      Dated December 21, 1971

Inventor(s) FRANCOIS DESVIGNES, PAUL GUIOCHON, AND JEAN POMPEI

It is certified that error appears in the above-identified patent and that said Letters Patent are hereby corrected as shown below:

Change the Priority date from "December 31, 1969" to

--December 31, 1968--.

Signed and sealed this 13th day of June 1972.

(SEAL)
Attest:

EDWARD M. FLETCHER, JR.
Attesting Officer

ROBERT GOTTSCHALK
Commissioner of Patents